Jan. 1, 1952     B. E. HIRSHON     2,580,780
METHOD OF MIXING SUBSTANCES
Filed March 21, 1950
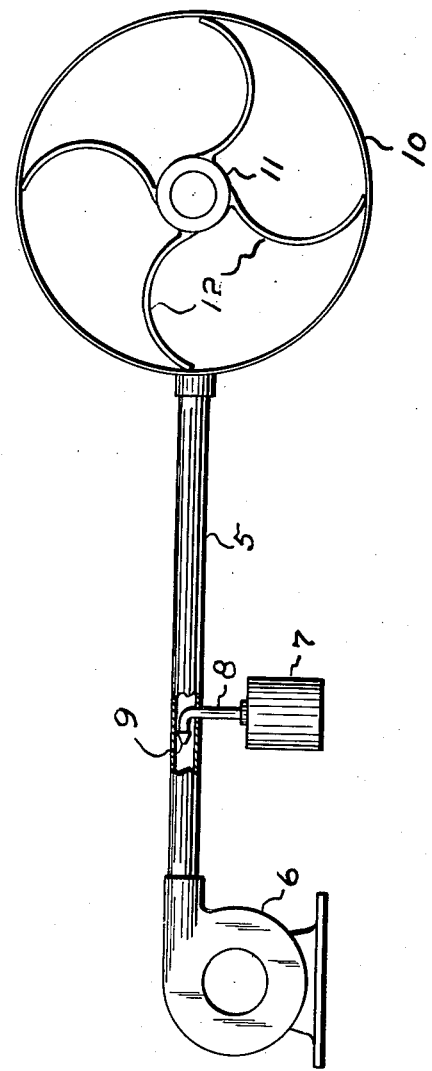
Inventor:
Benedict E. Hirshon,
by Abbott Spear
Attorney Patented Jan. 1, 1952

2,580,780

UNITED STATES PATENT OFFICE 2,580,780

METHOD OF MIXING SUBSTANCES

Benedict E. Hirshon, Brookline, Mass.

Application March 21, 1950, Serial No. 150,938

2 Claims. (Cl. 259—4)

My present invention relates to methods of efficiently and economically distributing relatively minute quantities of one or more substances uniformly through relatively huge masses of another substance or substances.

In agriculture and animal husbandry, for instance, it has been demonstrated that a complete lack in the soil of certain essential elements such as iron, manganese, zinc, copper, cobalt, boron and others, normally present in the soil in minute quantities, reflects itself in nutritional deficiencies in the animals that feed on the products grown on that soil. It has also been demonstrated that the addition to the soil of trace quantities of thiamin, measurable in milligrams per ton of fertilizer, as well as other vitamins and hormones, increases a crop yield substantially. In the poultry field, research has established that the addition of small quantities of factors of vitamin B complex to feed gives rise to marked economies in meat production.

My invention has, for its principal objective, the provision of a practicable process for thoroughly and uniformly mixing, on an efficient and economical basis, any quantity of a first substance, however minute, throughout any quantity of another substance, however huge.

In accordance with my invention, I provide a liquid mixture of the substance to be introduced into the main substance. Such a liquid mixture may be a solution, colloidal dispersion, or emulsion but the liquid into which the first substance is introduced is volatile and, for convenience, I shall hereinafter refer to the liquid as a volatile solvent and to the liquid mixture as a solution.

This solution is sprayed through a suitable atomizing nozzle into a stream of air or other gas which evaporates wholly or partially the volatile solvent and conducts the first substance in a finely subdivided state resulting from such evaporation of the droplets, together with any unevaporated liquid particles, if any, into the path of the second substance, which is moving in a direction to intersect the stream carrying the first substance. The second substance is in a dry state and either the entire mass or a sizeable part thereof is successively presented to intersect the stream to subdivide it and envelop separately the small subdivisions of the stream together with its suspended particles. The working and kneading action on these by the moving mass of the second substance serves to ensure a thorough and uniform distribution of the particles, to complete the evaporation of unevaporated solvent, if any, and to rob from the gas the first substance.

2

My invention, as thus defined, has the advantage of efficiency and economy. This is possible because it affords means of so subdividing the first substance as to make it possible to distribute it uniformly through the second substance. The degree of subdivision of the first substance depends both on the size of the spray droplets and the extent to which the solution has been diluted. For example, if a $1/_{100,000}$ solution of the first substance is atomized, the amount of the first substance per spray particle is $1/_{100,000}$ of its weight. The economy of my process lies in the fact that it provides a simple and direct method of handling desired small quantities without resorting to the use of concentrates or other expedients.

In the single figure of the accompanying drawing, I have shown schematically typical apparatus by which my methods may be practiced and which illustrate their essential features.

I have indicated at 5 in the drawing, a conduit through which air or other gas is delivered by a blower 6 to provide a stream of desired velocity and volume.

At 7, I have indicated the source of the first substance which is carried by a volatile liquid which may be a solvent or in which the first substance may be colloidally or otherwise dispersed. The particular volatile liquid employed depends on the nature of the first substance and may, for example, be water, alcohol, benzine or the like. Several first substances may be carried by one volatile liquid or there may be several sources 7. I have shown the source 7 as having a conduit 8 in communication with the interior of the conduit 5 and including a spray nozzle 9 shown as disposed towards the blower 6.

It will be appreciated that the gas stream may be heated, dehydrated, or otherwise conditioned if consistent with the nature of the gas or of the volatile liquid used. It will also be understood that it is desirable that the gas stream be conducted immediately to the second substance in order to prevent coalescence of the spray particles. Evaporation of the solvent in the conduit 5 will conceivably be incomplete due to the fact that the spray droplets are almost instantly accelerated to the velocity of the relatively short gas stream.

The gas stream together with its suspended particles, is delivered into a substantial mass of the second substance which is in a dry state and which may consist of one or more substances and this mass is moving angularly relative to the path of the gas stream. This may be effected as by placing the mass in a mixer consisting of a drum 10 housng a rotor 11 having blades 12 so that the entire mas of the second substance is tumbled and agitated to ensure the even distribution of the minutely subdivided particles therethrough, to rob the gas thereof, and to entrap and complete the evaporation of any spray droplets in the presence of the gas subdivisions. The gas escapes at low velocity from the mixer.

From the foregoing it will be apparent that my invention provides an efficient and economical method of distributing a small quantity of a first substance uniformly throughout a substantial mass of a second substance.

What I therefore claim and desire to secure by Letters Patent is:

1. A process for mixing a relatively small quantity of a first substance with a relatively large quantity of a second substance, said process comprising the steps of dispersing the first substance uniformly in a volatile liquid, atomizing the liquid in a gas stream and utilizing that stream to dry the spray, and moving at least a substantial part of the second substance in a non-compacted state across the path of said gas stream to rob said stream of suspended particles.

2. A process for mixing a relatively small quantity of a first substance with a relatively large quantity of a second substance, said process comprising the steps of atomizing a volatile liquid, throughout which the first substance is uniformly dispersed, in a gas stream, utilizing said stream to evaporate said liquid and delivering said gas stream into at least a substantial part of said second substance while agitating said part and moving it transversely relative to said gas stream.

BENEDICT E. HIRSHON.

REFERENCES CITED

The following references are of record in the file of this patent:

UNITED STATES PATENTS

| Number | Name | Date |
|---|---|---|
| 2,193,004 | Ish-Shalom | Mar. 12, 1940 |